United States Patent [19]

Block

[11] Patent Number: 4,541,485

[45] Date of Patent: Sep. 17, 1985

[54] COMPLETION AND WORKOVER FLUID

[75] Inventor: Jacob Block, Rockville, Md.

[73] Assignee: W. R. Grace & Co., New York, N.Y.

[21] Appl. No.: 507,352

[22] Filed: Jun. 24, 1983

[51] Int. Cl.$^4$ .......................... C09K 7/02; E21B 43/27
[52] U.S. Cl. ..................................... 166/281; 166/307; 252/8.5 A; 252/8.55 C; 252/8.55 B; 252/8.55 R
[58] Field of Search ..................... 252/8.55 R, 8.55 C, 252/8.55 B, 8.5 A, 8.5 C, 8.5 B, 8.5 P; 166/307, 281, 282, 275

[56] References Cited

U.S. PATENT DOCUMENTS

| | | | |
|---|---|---|---|
| 3,603,399 | 9/1971 | Reed | 166/292 |
| 3,656,889 | 4/1972 | Olewinski | 23/52 |
| 3,804,760 | 4/1974 | Darley | 252/8.55 R |
| 4,153,066 | 5/1979 | Griffin, Jr. | 252/8.55 R |
| 4,175,042 | 11/1979 | Mondshine | 252/8.5 A |
| 4,186,803 | 2/1980 | Mondshine | 166/292 |
| 4,192,753 | 3/1980 | Pye et al. | 252/8.5 A |
| 4,210,205 | 7/1980 | Allen et al. | 166/307 |
| 4,240,915 | 12/1980 | Block | 252/8.5 B |
| 4,245,702 | 1/1981 | Haafkens et al. | 166/307 |
| 4,255,268 | 3/1981 | Block | 252/8.5 A |
| 4,264,455 | 4/1981 | Block | 252/8.5 A |
| 4,349,443 | 9/1982 | Block | 252/8.5 A |
| 4,359,392 | 11/1982 | Rygg | 252/8.55 R |
| 4,366,070 | 12/1982 | Block | 252/8.5 A |
| 4,389,319 | 6/1983 | Block et al. | 252/8.5 A |
| 4,404,107 | 9/1983 | Cowan et al. | 252/8.55 R |
| 4,428,845 | 1/1984 | Block | 252/8.5 A |
| 4,447,341 | 5/1984 | Block | 252/8.5 A |

FOREIGN PATENT DOCUMENTS 1135493 1/1982 Canada.
827392 2/1960 United Kingdom.

OTHER PUBLICATIONS

Block, J. 1982, New Mud System Gets Field Trial, Oil and Gas Journal, Jan. 11, pp. 79–82.

*Primary Examiner*—Stephen J. Lechert, Jr.
*Assistant Examiner*—Howard J. Locker
*Attorney, Agent, or Firm*—Edward J. Cabic

[57] ABSTRACT

An aqueous completion or workover fluid for oil or gas wells having at least two solid components. One component is a hydroxy containing aluminum compound represented by the formula $AlO(OH) \cdot xH_2O$. The second component is a fluid loss control agent which can be either a cross-linked polyvinyl alcohol or a cross-linked hydroxyalkyl cellulose reaction product. An acid soluble weighting agent can be added for wells having higher down hole pressures. Examples of the weighting agents include iron carbonates, iron oxides, calcium carbonates, dolomite, sodium or calcium chloride, zinc bromide and calcium bromide. After use, the fluid can be displaced from the well with acid, e.g. 15% HCl, and the cake previously deposited on the bore-hole wall is dissolved by the acid so that no damaging residue remains.

24 Claims, No Drawings

COMPLETION AND WORKOVER FLUID

BACKGROUND OF THE INVENTION

1. Field of the Invention

This invention relates to an aqueous based fluid for use as a completion or workover fluid for oil and gas wells.

2. Description of the Previously Published Art

An important step in the production of oil and gas from wells is the completion of a drilled well. Such completion may comprise numerous subtasks including perforation, cementing, acidizing, fracturing, and others. An important task is the removal of well debris through the use of a completion fluid. The irrigation of a drilled well with a completion fluid washes or floats out various forms of drilling or other debris which could otherwise clog the petroleum producing strata and impede delivery of oil or gas to the production site for recovery. A similar type of fluid is employed during workover of an established well. Workover is a term generic to a process for revitalizing a well to improve its productive performance. Fluid removal of debris following such a workover is usually required; fluids for this purpose share many requirements with completion fluids.

Those skilled in the art will appreciate that numerous requirements may be imposed upon completion and workover fluids depending upon the different conditions found in oil field operations. Ideally, a completion fluid should cause little permeability damage, minimize corrosion, remain stable downhole, weigh up to the desired specific gravity and have the proper viscosity characteristics. It will be understood that conditions down in the bottom of the hole of an oil or gas well are nearly always substantially different from atmospheric temperature and pressure. In general, such locations are under elevated pressure from surrounding strata and experience elevated temperatures. Temperatures in excess of 225°-250° F. are common and much higher temperatures are not uncommon. As wells are sunk to greater and greater depths, higher temperatures and pressures will be experienced.

It has long been appreciated that clear brines can be used for completion and workover. These materials must, in general, have specific gravities or densities higher than that of water. Thus, such fluids commonly comprise aqueous solutions of inorganic salts resulting in densities higher than 8.3 pounds per gallon for water. For example, saturated solutions of potassium chloride, sodium chloride, and calcium chloride have densities of 9.7, 10.0, and 11.6 pounds per gallon respectively. Such elevated densities are needed to maintain a hydrodynamic equilibrium between the downhole pressure and the clear brine completion or workover fluid. Without the aid of this high density there exists the possibility that the well would blow out. Such increased density also aids in the suspension of debris particles for transport out of the well.

The second requirement for these fluids is that of viscosity. It is known that such brines should possess viscosities which facilitate the suspension and transport of debris particles. Accordingly, viscosifiers are generally added to such brines. Examples of these viscosifiers are guar, xanthan, and other gums, modified celluloses, especially hydroxyethyl cellulose (HEC), and biologically modified saccharides such as "XC" polymer (sold by Kelco) and others. One type of preferred material for such viscosifiers are the modified celluloses, especially HEC.

In addition to maintaining viscosity during the completion or workover operations it is frequently desirable, following termination of such procedures, to dissolve or degrade the wall cake. It is known, for example, that acidification of HEC-modified brines will cause hydrolysis of the HEC and the breakdown of the HEC wall cake. It is thus important to maintain the ability to break the HEC-modified brines with acid or otherwise when desired while avoiding degradation in viscosity during use for completion or workover.

A major problem with the employment of fluids made of HEC and brines used at high temperatures, however, has been a relatively rapid breakdown of viscosity of the solutions during use. This breakdown, which is believed to be caused by depolymerization of the cellulosic structure or by other modifications thereof, has diminished the effectiveness of completion and workover applications employing such viscosified brines. The breakdown in viscosity is most dramatically affected by changes in downhole temperature, becoming serious above about 225° F. and critical above about 250° F.

Attempts have been made to stabilize the clear brines. R. H. Rygg in U.S. Pat. No. 4,359,392 discloses the use of copper species such as copper metal, copper salts or organocuprates. However, the resulting brine solution can become expensive and it becomes complicated to formulate and maintain because of the need to add the salts, the viscosifier, and the stabilizer.

In another brine system, T. C. Mondshine in U.S. Pat. No. 4,186,803 uses bridging agents to deposit a thin film of solids to temporarily bridge over the formation pores. His agents are water soluble salts which are insoluble in the saturated brine solution.

In U.S. Pat. No. 4,192,753 D. S. Pye et al disclose an aqueous well completion and workover fluid having many components. They include (1) a particulate resin having a relatively high softening point resin having a softening point of 135° C. or above made of rosin acids, rosin esters, coumarone-indene resins, petroleum resins, polymers derived from one or more terpenes and condensation products of aromatic hydrocarbons with formaldehyde, (2) a water-soluble inorganic salt and (3) a microemulsion. The microemulsion is made of (1) an oil-soluble surface active agent, (2) a water-dispersible surface active agent, (3) wax, and (4) a relatively low softening point resin having a softening point of about 90° to 134° C., where this resin is made of rosin acids, rosin esters, coumarone-indene resins, petroleum resins, polymers derived from one or more terpenes, and condensation products of aromatic hydrocarbons with formaldehyde.

OBJECTS OF THE INVENTION

It is an object of the present invention to provide a fluid for completion and workover purposes which is effective under high temperatures and pressures, which can be eliminated by acidification when the downhole work is terminated and which is easy to formulate by mixing with water.

It is a further object of this invention to provide a fluid which is non-damaging to the formation and which can be used as a completion or workover fluid.

It is a further object of this invention to provide a completion or workover fluid which has shear-thinning rheological properties so that is will be easier to pump in the formation than a Newtonian fluid.

It is a further object of this invention to provide a completion or workover fluid which has good water-loss control to avoid formation damage by swelling and to avoid loss of expensive completion fluid material.

It is a further object of this invention to use a unique drilling fluid which has good water-loss control as a completion or workover fluid.

It is a further object of this invention to use a drilling fluid which is soluble in 15% HCl.

It is a further object of this invention to be able to drill a well with a conventional weighted drilling fluid and to then complete the well with the unique and soluble completion fluid according to the present invention so that upon subsequent treatment with acid the solid cake layer formed on the walls of the well is dissolved away.

These and further objects will become apparent as the description of the invention proceeds.

SUMMARY OF THE INVENTION

For wells having a relatively low formation pressure, the completion or workover fluid according to the present invention is an aqueous mixture having two solid components. One component is a hydroxy containing aluminum compound preferably formed in a prescribed manner from water-soluble acidic and basic agents. This aluminum material can be represented by the formula $AlO(OH).xH_2O$ and hereafter it will be referred to as $AlO(OH)$ for brevity. The second component is a fluid loss control agent which can be either a cross-linked polyvinyl alcohol or a cross-linked hydroxyalkyl cellulose reaction product. These cross-linked products have superior thermal stability as compared to the corresponding non cross-linked materials. For wells which have higher down hole pressures, an acid soluble weighting agent can be added. Examples of the acid soluble weighting agents include iron carbonates such as siderite, iron oxides including mixtures of different forms of iron oxides, calcium carbonates and dolomite which is a calcium-magnesium carbonate. Other materials which can be used are sodium chloride, calcium chloride, calcium bromide and zinc bromide.

After use, the fluid can be displaced from the well with acid, e.g. 15% HCl, and the cake previously deposited on the bore-hole wall is dissolved by the acid. The acid destroys the cake, and leaves no damaging residue. HCl concentrations other than 15% can also be used. Acids other than HCl can be used, but these are usually more expensive.

In another aspect of the invention a well can be drilled with a conventional weighted drilling fluid having a weighting agent such as barite. Then at the end of the drilling phase, the conventional drilling mud is displaced with the weighted completion or workover fluid according to the present invention where the weighting agent is an acid soluble weighting agent. After the completion work is finished, the solid cake formed on the walls of the well can be treated with acid to dissolve away the solid cake so as to permit enhanced production from the well.

DESCRIPTION OF THE PREFERRED EMBODIMENTS

Although various types of viscosifying agents are known and used, it is preferred to employ a shear thinning liquid because this liquid will be easier to pump. In addition, such a liquid readlily sweeps away the cuttings at the bottom of the hole and it then keeps them better in suspension as they are carried up to the top of the hole.

The fluids used according to the present invention have an n value of less than about 0.4 in the rheological power law model relationship of $$\tau = K(\gamma)^n$$

where $\tau$ represents the shear stress exerted on the aqueous system of the fluid in units such as pounds per 100 $ft^2$ or $dynes/cm^2$; $\gamma$ is the shear rate in units of reciprocal time such as $sec^{-1}$; K is a constant having the value of the shear stress of the particular system at a shear rate of 1 $sec^{-1}$; and n is a constant related to the degree of departure from Newtonian behavior. For example if $n=1$, the fluid is Newtonian, if n is less than 1, the fluid is shear-thinning. The lower the n value the more shear-thinning the fluid.

One of the two solid component systems which can be used as a completion or workover fluid is the AlO(OH)cross-linked polyvinyl alcohol system described in U.S. Pat. No. 4,349,443 and in reissue application Ser. No. 446,217 filed Dec. 2, 1982, now No. Re. 31748, the entire contents of both are incorporated herein by reference. The amounts of the (a) AlO(OH) viscosifier and (b) cross-linked polyvinyl alcohol are sufficient to directly form an aqueous system having from 0.5 to 10 weight percent component (a) and from 0.3 to 5 weight percent of component (b). This mud system has also been described in the Oil and Gas Journal, Jan. 11, 1982, page 79. All of these disclosures are directed to using the composition as a drilling mud. There has been no suggestion in either the patent or the journal article that the composition could be used as a completion or workover fluid.

The AlO(OH) component used in all of the embodiments is preferably formed by mixing in an aqueous medium and under a high degree of agitation a water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product imparts to said aqueous medium a pH of from at least about 8 to about 10.3.

In the more preferred embodiment the concentration of the AlO(OH) being made cannot be too high because the reaction mixture becomes too viscous. Similarly, the product AlO(OH) concentration should not be too low because then the aluminum compound product is not being economically produced. Preferable AlO(OH) concentrations in the reaction product mixture would be from about 1 to 6%.

Another preferred procedure for making the AlO(OH) is to react HCl with a stabilized sodium aluminate solution as described in U.S. patent application Ser. No. 370,979 filed Apr. 22, 1982, the entire contents of which are incorporated herein by reference. The method basically involves forming the AlO(OH) in the presence of a hydroxy acid such as gluconic acid, tartaric acid, gallic acid, citric acid or a mixture of these acids or in the presence of a salt of these acids such as the sodium, potassium or ammonium salt.

The amount of the AlO(OH) in the workover or completion fluid is broadly from about 0.5 to 10 weight percent. A more preferred range is from about 1–6% AlO(OH) with 3% AlO(OH) being most preferred.

The cross-linked polyvinyl alcohol component for this first embodiment is preferably a reaction product formed in an aqueous acidic medium having a pH of less than about 5.5 between polyvinyl alcohol having a weight average molecular weight of at least 20,000 with at least 0.01 percent of stoichiometry (i.e. one aldehyde group per 2 OH groups) of a compound containing at least one aldehyde group therein or capable of generating in situ at least one aldehyde group.

Conventionally, polyvinyl alcohol is the hydrolyzed product of polyvinyl acetate. The hydrolysis should be at least about 75 percent complete and preferably from about 80 to 95 percent complete to form a suitable polyvinyl alcohol reactant. More preferably, the polyvinyl alcohol is about 87% hydrolyzed. Such a product is commercially available as Gelvatol 20–90 from Monsanto.

To lower the amount of the cross-linking compound containing the aldehyde group one can use a polyaldehyde which has more than one aldehyde group per molecule. A preferred polyaldehyde to form the desired polyvinyl alcohol/polyaldehyde reaction product is disclosed in U.S. patent application Ser. No. 326,876 now U.S. Pat. No. 4,428,845, filed Dec. 2, 1981, and the entire contents of which are incorporated herein by reference. This polyaldehyde is an organic compound represented by the general formula:

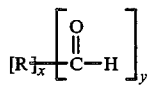

wherein R is an organic radical capable of forming at least two covalent bonds with carbonyl groups. R can be selected from organic saturated or unsaturated aliphatic cycloaliphatic, aromatic or heterocyclic radicals, x is an integer of 0 or 1 and y is an integer of at least 2. The upper value of y is dependent on the capability of R to form covalent bonds with carbonyl groups. The preferred polyaldehydes are dialdehydes wherein R is a divalent hydrocarbon having from 1 to 12 carbons and preferably from 1 to 6 carbons, as for example, malonaldehyde, succinaldehyde, glutaraldehyde, adipaldehyde, malealdehyde, fumaraldehyde, phthalaldehyde and the like. The especially preferred material is glutaraldehyde. In addition, the dialdehyde having the above general formula wherein x is 0, which is known as glyoxal, is also a preferred material.

Another two solid component system which can also be used as a completion or workover fluid according to the present invention is the AlO(OH) - cross-linked hydroxy $C_1$–$C_3$ alkyl cellulose system. This system is described in U.S. Pat. No. 4,366,070 and the entire content of this patent is incorporated herein by reference. The amount of the AlO(OH) and cross-linked hydroxyalkyl cellulose is substantially the same as for the corresponding AlO(OH) - cross-linked polyvinyl alcohol system. Here again, this patent disclosure is directed to using the composition as drilling mud and there is no suggestion to use the composition as a completion or workover fluid.

The cross-linked hydroxyalkyl cellulose component for this second embodiment is preferably a reaction product formed by contacting in an aqueous medium a hydroxy $C_1$–$C_3$ alkyl cellulose and from about 0.01 to 200 percent of stoichiometry based on the hydroxy groups of the cellulose of an agent capable of cross-linking the cellulose. The preferred hydroxyalkyl cellulose is hydroxyethyl cellulose. The agent is preferably epihalohydrin or either a compound having a least one aldehyde group therein or a compound capable of generating an aldehyde group in situ. The reaction between the hydroxyalkyl cellulose and ephihalohydrin is carried out in an aqueous basic medium having a pH of about 9.5 or more. The reaction between the hydroxyalkyl cellulose and the compound having or capable of generating at least one aldehyde group therein is carried out in an aqueous acidic medium having a pH of about 5.5 or less.

It is also possible to use a combination of the cross-linked polyvinyl alcohol and the cross-linked hydroxyalkyl cellulose.

The amount of the cross-linked polyvinyl alcohol or hydroxyalkyl cellulose is sufficient to directly form an aqueous system having from 0.3 to 5 weight percent of this material.

In another embodiment of the invention a chemical compound capable of converting to a higher oxidation state under alkaline conditions can be added to the fluid to provide a high temperature composition. This compound is described in U.S. Pat. No. 4,389,319 (application Ser. No. 257,460, filed Apr. 24, 1981), and the entire contents of which are incorporated herein by reference. The ability of the compound to make such a conversion is not meant to limit this embodiment to the requirement that the subject compound undergoes such conversion or that the agent, per se, is merely the precursor for the product required in the subject composition. The compound can be organic or inorganic and of monomeric, low molecular weight. Organic compounds which are suitable include alkanols, preferably lower $C_1$–$C_5$ alkanols, as, for example, methanol, ethanol, n-propanol, iso-propanol, butanols and pentanols and the like; phenols such as phenol, $C_1$–$C_3$ alkyl, aryl and alkaryl substituted phenols, tert-butylcatechol and hydroquinone and the like; mercaptans such as $C_1$–$C_{15}$ alkanethiols and the like. In addition the agent can be an inorganic readily oxidizable substance such as an alkali metal or alkaline earth metal or ammonium salt of sulfite, bisulfite, thiosulfate, hydrosulfite or nitrite; ferrous or cuprous metal salts of chloride or sulfate; and alkali metal borohydrides and the like and their equivalence. The preferred materials are water soluble $C_1$–$C_5$ alkanols, sulfite salts, bisulfite salts and nitrite salts of an alkali or alkaline earth metal or ammonium. The chemical compound capable of converting to a higher oxidation state described herein above should be used in amounts such that the ratio of the chemical compound to the cross-linked polymeric reaction product is at least 0.2:1 with, preferably, a ratio of 0.2:1 to 1:1 and most preferably a ratio of at least 0.25:1 to 0.75:1.

Compositions having the combination of the above described components have unexpectedly been found to exhibit the desired combination of properties of pseudoplasticity and fluid-loss control which are unattainable by separate use of the materials. Further, the composition is capable of maintaining these properties under elevated temperatures found in deep bore hole drilling such as greater than 250° F. (121° C.) and they are generally stable at temperatures of 300° F. (149° C.) and greater.

When drilling in wells which have higher down hole pressures, an acid soluble weighting agent can be added to the workover or completion fluid. Examples of an acid soluble weighting agent include iron carbonates such as siderite, iron oxides including mixtures of different forms of iron oxides, calcium carbonates and dolomite which is a calcium-magnesium carbonate. Also useable are other known weighting agents such as sodium chloride, calcium chloride, calcium bromide and zinc bromide. A preferred commercially available material is Densimix ® Weight Material which is a micaceous hematite (an iron oxide of the formula $Fe_2O_3$) produced from the mineral itabirite and sold by Densimix, Inc., Houston, Texas.

When a well has been drilled with a conventional drilling fluid which contains a weighting agent such as barite, it can then be completed with the completion fluid according to the present invention which also has the acid soluble weighting agent present. During the completion process a solid cake will form on the wall of the well to prevent the loss of the completion fluid. After the completion process is finished, an acid can be added to the well to dissolve away the solid cake on the walls of the well. A preferred acid is hydrochloric acid because of its low cost. It is available in many commercially available concentrations with the 15% HCl concentration being particularly preferred.

Having described the basic aspects of our invention, the following examples are given to illustrate specific embodiments thereof.

EXAMPLE 1

A fluid containing 2.4% AlO(OH) and 1.6% cross-linked polyvinyl alcohol was prepared. The AlO(OH) was prepared by reacting HCl and sodium aluminate (stabilized) solution as described in U.S. patent application Ser. No. 370,979 now U.S. Pat. No. 4,431,550, filed Apr. 22, 1982. The cross-linked PVA was prepared by reacting Gelvatol 9000 made by Monsanto (fine sized Gelvatol 20-90) with formaldehyde as previously described in U.S. Pat. No. 4,349,443. The rheological and water-loss properties of the fluid are summarized in the table below.

| RHEOLOGICAL AND WATER-LOSS PROPERTIES OF FLUID USED IN TEST | | | |
| --- | --- | --- | --- |
| n | K (lb-sec/100 ft$^2$) | API Water-Loss (Ambient) (cc/30 min) | Cake Thickness (in) |
| 0.33 | 1.6 | 5.4 | 1/32 |

The results show that the fluid was shear-thinning and had good water-loss control.

The fluid was removed from the test cell, and 100 ml. of 15% HCl solution were carefully added to the cell. (The HCl was poured down the side of the cell to avoid breaking up the cake.) After allowing the acid and cake to react for 30 minutes, the cell was re-pressurized to 100 psi and the filtration was measured. All 100 ml. of acid was expelled within 15 seconds, indicating that the cake can be readily removed by this procedure. This experiment demonstrates that the fluid can be used for completions and workovers.

EXAMPLE 2

A fluid was prepared similar to the fluid of Example 1 with the exception that dolomite was added to produce a final mud weighing 12.4 pounds/gallon. The mud contained 1.4% AlO(OH), 0.9% cross-linked PVA, 47.1% dolomite and the remainder was water. The properties of this fluid are described in the table below.

| RHEOLOGICAL AND WATER-LOSS PROPERTIES OF FLUID USED IN TEST | | | |
| --- | --- | --- | --- |
| n | K (lb-sec/100 ft$^2$) | API Water-Loss (Ambient) (cc/30 min) | Cake Thickness (in) |
| 0.16 | 72.0 | 3.4 | 4/32 |

The results show that the fluid was shear-thinning and had good water-loss control.

The fluid was removed from the test cell and 300 ml of 15% HCl solution were carefully added to the cell as in Example 1. After allowing the acid and cake to react for 30 minutes, the cell was repressurized to 100 psi and the filtration was measured. 103 ml were expelled in 30 minutes, indicating that most of the cake was removed by this procedure. The remaining cake can be readily removed by further acid addition. The experiment demonstrates that the fluid can be used for completion and workover.

It is understood that the foregoing detailed description is given merely by way of illustration and that many variations may be made therein without departing from the spirit of this invention.

What is claimed is:

1. In the method for completion or workover of a well penetrating a subterranean reservoir wherein a completion or workover fluid is passed through the well into contact with the subterranean reservoir as part of the completion or workover method, the improvement which comprises (1) employing as the completion or workover fluid an aqueous composition comprising an admixture of:
   (a) a hydroxy containing aluminum component formed by mixing in an aqueous medium and under a high degree of agitation a water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product imparts to said aqueous medium a pH of from at least about 8 to about 10.3, said component being present in the aqueous composition in an amount of from about 0.5 to 10 weight percent; and
   (b) a fluid loss control agent selected from the group consisting of
      (i) a reaction product formed in an aqueous acidic medium having a pH of less than about 5.5 between polyvinyl alcohol having a weight average molecular weight of at least 20,000 with at least 0.01 percent of stoichiometry of a compound containing at least one aldehyde group therein or capable of generating in situ at least one aldehyde group;
      (ii) a cross-linked hydroxyalkyl cellulose reaction product, said reaction product formed by contacting in an aqueous medium a hydroxy $C_1$-$C_3$ alkyl cellulose and from about 0.01 to 200 percent of stoichiometry based on the hydroxy groups of the cellulose of an agent capable of cross-linking said cellulose, said agent being epihalohydrin or said agent being a compound having a least one aldehyde group therein or a compound capable of generating an aldehyde group in situ; the reaction between said hydroxyalkyl cellulose and ephihalohydrin being carried out in an aqueous basic medium having a pH of about 9.5 or more and the reaction between said hydroxyalkyl cellulose and said compound having or capable of generating at least one aldehyde group therein being carried out in an aqueous acidic medium having a pH of about 5.5 or less; and (iii) mixtures therof; said fluid loss control agent being present in the aqueous composition in an amount of about 0.3 to 5 weight percent; and (2) displacing said completion or workover fluid and treating the well with acid to dissolve away any solid cake layer from the completion or workover fluid that has deposited on the walls of the well.

2. The method according to claim 1, wherein the hydroxy containing aluminum component is formed in a reaction mixture at a concentration of from about 1 to 6% by weight.

3. The method according to claim 1, wherein the completion or workover fluid of claim 1 further comprises an acid soluble weighting agent.

4. The method according to claim 3, wherein the acid soluble weighting agent is iron carbonate, iron oxide, calcium carbonate, dolomite, sodium chloride, calcium chloride, calcium bromide, zinc bromide or mixtures thereof.

5. The method according to claim 1, wherein the polyvinyl alcohol in reaction product (i) is about 87% hydrolyzed.

6. The method according to claim 1, wherein the hydroxy containing aluminum component is present in an amount of from about 1 to 6 weight percent.

7. The method according to claim 6, wherein the hydroxy containing aluminum component is present in an amount of about 3 weight percent.

8. The method according to claim 1, wherein the completion or workover fluid of claim 1 further comprises a chemical compound capable of converting to a higher oxidation state under alkaline conditions.

9. The method according to claim 8, wherein the chemical compound capable of converting to a higher oxidation state under alkaline conditions is selected from the group consisting of $C_1$-$C_5$ alkanols; unsubstituted or $C_1$-$C_3$ alkyl, aryl or alkaryl substituted phenols; hydroquinone; $C_1$-$C_{15}$ alkanethiol; alkali metal, alkaline earth metal or ammonium salt of sulfite, bisulfite, thiosulfate, hydrosulfite, or nitrite; ferrous metal salts of chloride or sulfate; cuprous metal salts of chloride or sulfate; and alkali metal borohydrides.

10. The method according to claim 1, wherein the hydroxy containing aluminum component is formed in the presence of a hydroxy acid or salt thereof and where said acid is gluconic acid, tartaric acid, gallic acid, citric acid or a mixture of these acids and said salt is a sodium, potassium or ammonium salt.

11. The method of claim 1, wherein the acid is hydrochloric acid.

12. The method of claim 11, wherein the acid is about 15% hydrochloric acid.

13. The method of claim 1, wherein the fluid has an n value in the power law model of less than about 0.4.

14. A completion or workover fluid composition for wells comprising an aqueous composition comprising an admixture of:

(a) a hydroxy containing aluminum component formed by mixing in an aqueous medium and under a high degree of agitation a water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product imparts to said aqueous medium a pH of from at least about 8 to about 10.3, said component being present in the aqueous composition in an amount of from about 0.5 to 10 weight percent; and (b) a fluid loss control agent selected from the group consisting of (i) a reaction product formed in an aqueous acidic medium having a pH of less than about 5.5 between polyvinyl alcohol having a weight average molecular weight of at least 20,000 with at least 0.01 percent of stoichiometry of a compound containing at least one aldehyde group therein or capable of generating in situ at least one aldehyde group;

(ii) a cross-linked hydroxyalkyl cellulose reaction product, said reaction product formed by contacting in an aqueous medium a hydroxy $C_1$-$C_3$ alkyl cellulose and from about 0.01 to 200 percent of stoichiometry based on the hydroxy groups of the cellulose of an agent capable of cross-linking said cellulose, said agent being epihalohydrin or said agent being a compound having at least one aldehyde group therein or a compound capable of generating an aldehyde group in situ; the reaction between said hydroxyalkyl cellulose and epihalohydrin being carried out in an aqueous basic medium having a pH of about 9.5 or more and the reaction between said hydroxyalkyl cellulose and said compound having or capable of generating at least one aldehyde group therein being carried out in an aqueous acidic medium having a pH of about 5.5 or less; and (iii) mixtures thereof; said fluid loss control agent being present in the aqueous composition in an amount of about 0.3 to 5 weight percent; and an acid soluble weighting agent.

15. A composition according to claim 14, wherein the acid soluble weighting agent is iron carbonate, iron oxide, calcium carbonate, dolomite, sodium chloride, calcium chloride, calcium bromide, zinc bromide or mixtures thereof.

16. A composition according to claim 15, wherein the acid soluble weighting agent is iron oxide.

17. A composition according to claim 14, wherein the polyvinyl alcohol in reaction product (i) is about 87% hydrolyzed.

18. A composition according to claim 14, wherein the hydroxy containing aluminum component is present in an amount of from about 1 to 6 percent.

19. A composition according to claim 14, wherein the hydroxy containing aluminum component is present in an amount of about 3 weight percent.

20. A composition according to claim 14, wherein the completion or workover fluid further comprises a chemical compound capable of converting to a higher oxidation state under alkaline conditions.

21. A composition according to claim 20, wherein the chemical compound capable of converting to a higher oxidation state under alkaline conditions is selected from the group consisting of $C_1$–$C_3$ alkyl, aryl, or alkaryl substituted phenols; hydroquinone; $C_1$–$C_{15}$ alkanethiol; alkali metal, alkaline earth metal or ammonium salt of sulfite, bisulfite, thiosulfate, hydrosulfite, or nitrite; ferrous metal salts of chloride or sulfate; cuprous metal salts of chloride or sulfate; and alkali metal borohydrides.

22. A method of drilling a well comprising the steps
   (a) drilling the well with a conventional drilling mud and a barite weighting agent;
   (b) displacing the mud in step (a) with a completion or workover fluid of claim 14;
   (c) completing the well; and
   (d) treating the well with acid to dissolve away any solid cake layer from the completion or workover fluid that has deposited on the walls of the well.

23. The method of claim 22, wherein the acid is hydrochloric acid.

24. The method of claim 23, wherein the acid is about 15% hydrochloric acid.

* * * * *